ary Examiner—Anthony Skapars
United States Patent [19]

Tsutsumi et al.

[11] Patent Number: 4,621,033
[45] Date of Patent: Nov. 4, 1986

[54] FUEL CELL SYSTEM AND ITS VIBRATION-PROOF DEVICE

[75] Inventors: Masaru Tsutsumi, Hyogo; Hideo Hagino, Otsu; Osamu Fujiwara, Takasago, all of Japan

[73] Assignee: Sanyo Electric Co., Ltd., Moriguchi, Japan

[21] Appl. No.: 799,720

[22] Filed: Nov. 19, 1985

[30] Foreign Application Priority Data

Nov. 20, 1984 [JP] Japan ................. 59-245401

[51] Int. Cl.⁴ ............................................. H01M 2/10
[52] U.S. Cl. ............................................. 429/12; 429/34
[58] Field of Search ............... 429/12, 34, 96, 100, 429/122

[56] References Cited

U.S. PATENT DOCUMENTS 3,269,866  8/1966  Dixon et al. ............... 429/34 X
4,430,390  2/1984  Fekete ........................ 429/34
4,548,875 10/1985  Lance et al. ............... 429/34 X

*Primary Examiner*—Anthony Skapars
*Attorney, Agent, or Firm*—Armstrong, Nikaido, Marmelstein & Kubovcik

[57] ABSTRACT

A fuel cell system of the kind wherein a fuel cell stack is housed in a pressure vessel, comprises a vibration-proof device arranged between the top of the fuel cell stack and the pressure vessel. The vibration-proof device comprises a forcing means mounted on an interior wall of the top of the pressure vessel, and a counter member mounted on the top of the fuel cell stack and provided with at its top with a projection or recess in a spherical or conical form, the forcing means comprising a pressure member provided at its bottom with a recess or projection in a spherical or conical form and forced downward to engage with the top of the counter member.

8 Claims, 3 Drawing Figures

FUEL CELL SYSTEM AND ITS VIBRATION-PROOF DEVICE

BACKGROUND OF THE INVENTION

1. Field of the Invention

This invention relates to a fuel cell system of the kind wherein a fuel cell stack is housed in a pressure vessel. More particularly, the present invention relates to a vibration-proof device for preventing a fuel cell stack housed in a pressure vessel from inclination or overturning when the pressure vessel is subjected to strong vibrations during working process or transportation.

2. Description of the Prior Art

Recently, it has been proposed to operate a fuel cell system with pressurized process gases to improve an efficiency of the conversion of fuel energy into electric output. In such a system, the fuel cell stack is built up of an arrangement of alternate layers of a fuel cell and a bipolar plate. Fuel cell stack is housed in a pressure vessel kept at a pressure approximately equal to that of the process gases. The fuel cell stack is mounted at its lower end onto a supporting plate fixed to the bottom of the pressure vessel, however, vibration-proof consideration has scarcely been taken in the design of the fuel cell system. The fuel cell stack of the prior art is low in height and in the center of gravity because of a small number of fuel cells, so that the fuel cell stack is relatively stable to vibrations.

However, the greater the output of the fuel cell system, the greater is the number of the fuel cells, resulting in increase in the height of the fuel cell stack. For example, if the number of the fuel cells is increased to 300 to 400, the height of the fuel cell stack becomes 2 to 3 m. Thus, the fuel cell stack vibrates with the largest amplitude at the free top end when the pressure vessel is subjected to strong shocks or vibrations resulting from an earthquake or transportation. If the amplitude of the vibrations or shocks is extremely high, the fuel cell stack would be leaned against the vessel or laid on its side even if it is mounted at its bottom onto the supporting plate in the vessel.

Accordingly, if considered from the standpoint of safety and reliability, it is essential for applications of a fuel cell system with high output power to prevent the fuel cell stack from its inclination or overturning which results from vibrations or shocks during working operation and transportation.

It is an object of the present invention to provide an improved fuel cell system of the kind wherein a fuel cell stack is housed in a pressure vessel.

Another object of the present invention is to provide a vibration-proof device for a pressurized fuel cell system of the kind comprising a large number of fuel cells.

According to the present invention, there is provided a fuel cell system of the kind wherein a fuel cell stack is housed in a pressure vessel comprising a vibration-proof device arranged between the top of the fuel cell stack and the pressure vessel, said device comprising a forcing means mounted on an interior wall of the top of the pressure vessel, and a counter member mounted on the top of the fuel cell stack and provided with at its top with a projection or recess in a spherical or conical form, said forcing means comprising a pressure member provided at its bottom with a recess or projection in a spherical or conical form and forced downward to engage with the top of said counter member.

In a preferred embodiment, the pressure member is provided with a spherical or conical recess, while the counter member is provided with a spherical or conical projection engaged with the recess of the pressure member.

The pressure member may be provided with a spherical or conical projection. In this case, the counter member is provided with a spherical or conical recess. The projection of the pressure member or counter member may be formed in a stepped spherical or conical form. In another embodiment, a buffer member is applied to a surface of the recess formed in the pressure member or counter member.

The advantages and other features of the present invention will become more apparent from the following description taken in conjunction with the accompanying drawings.

DETAILED DESCRIPTION OF THE PREFERRED EMBODIMENT

Figure 1:
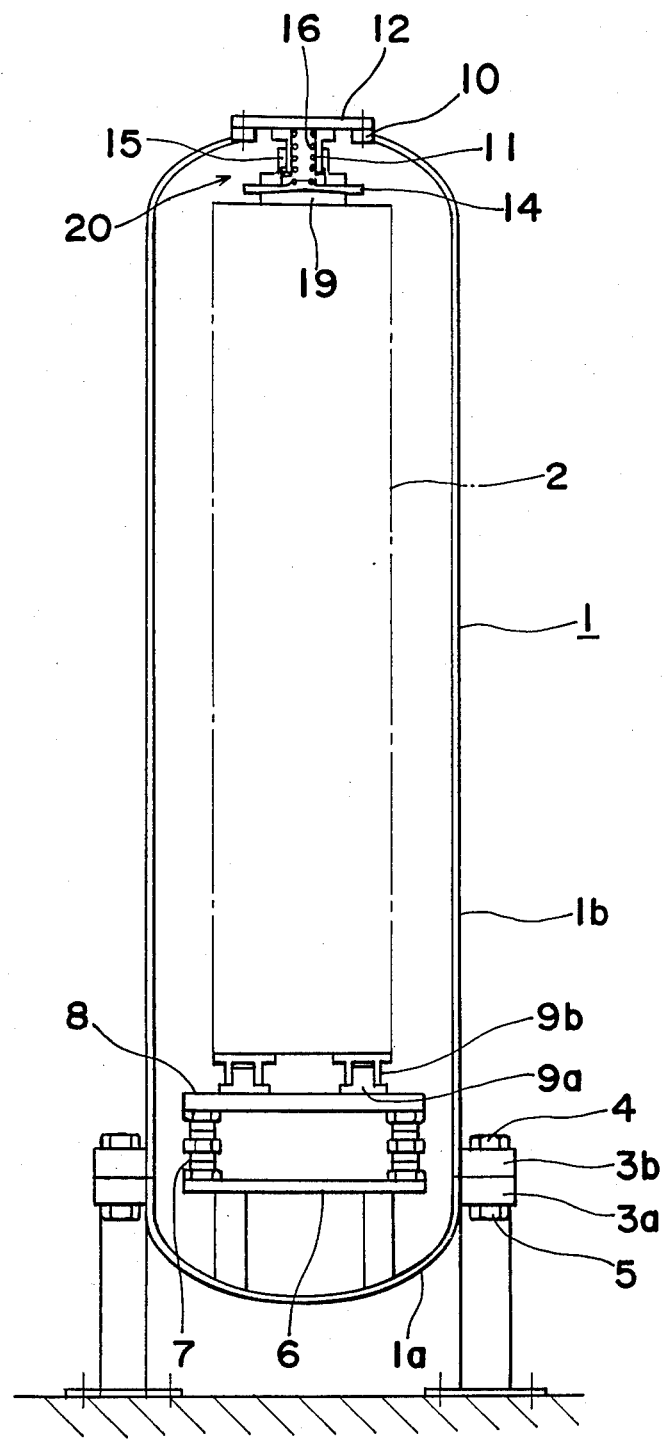
FIG. 1 is a schematic sectional view of a fuel cell system provided with a vibration-proof device according to the present invention.

Referring to FIG. 1, there is shown a fuel cell system equipped with a vibration-proof device 20 in accordance with the present invention which comprises a pressure vessel 1 built up of a lower shell 1a and an upper shell 1b, and a fuel cell stack 2 arranged in the pressure vessel 1. The lower shell 1a of the vessel 1 is provided at its upper end with an outwardly projecting transverse flange 3a to which a similarly flanged upper shell 1b is sealingly secured by bolts 4 and nuts 5. The inside of the lower shell 1a is provided with a support 6 on which a leveling head 8 is fixed by level adjusting bolts 7. The upper shell 1b of the pressure vessel 1 is provided at the center of its top with an annular opening formed by an inwardly projecting flange member 10 on which a lid body 12 is sealingly secured by spaced bolts 13.

The fuel cell stack 2 is provided at its bottom with an annular member 9b positioned by a retainer 9a mounted on the leveling head 8 to hold the stack in a vertical position. Also, the fuel cell stack 2 is provided with means for applying a predetermined compressive loading to the fuel cell stack to form a seal among the fuel cell components including fuel cells and bipolar plates, and manifolds for introducing and exhausting the process gases to or from the fuel cell stack, however, such means are not illustrated in the drawings for their simplification since such means are well known and have no immediate connection with the vibration-proof device of the present invention.

Figure 2:
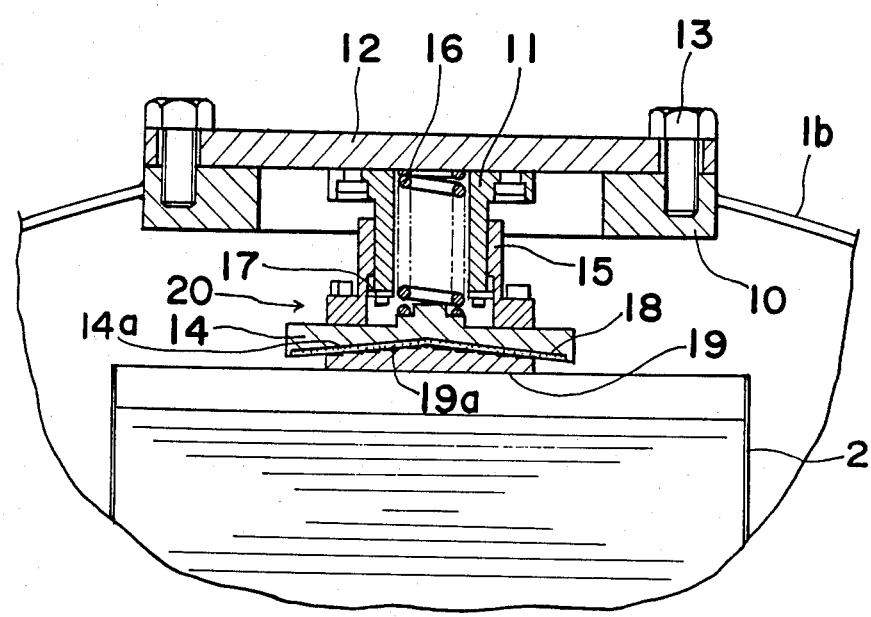
FIG. 2 is an enlarged sectional view of a selected part of the fuel cell system of FIG. 1.
Figure 3:
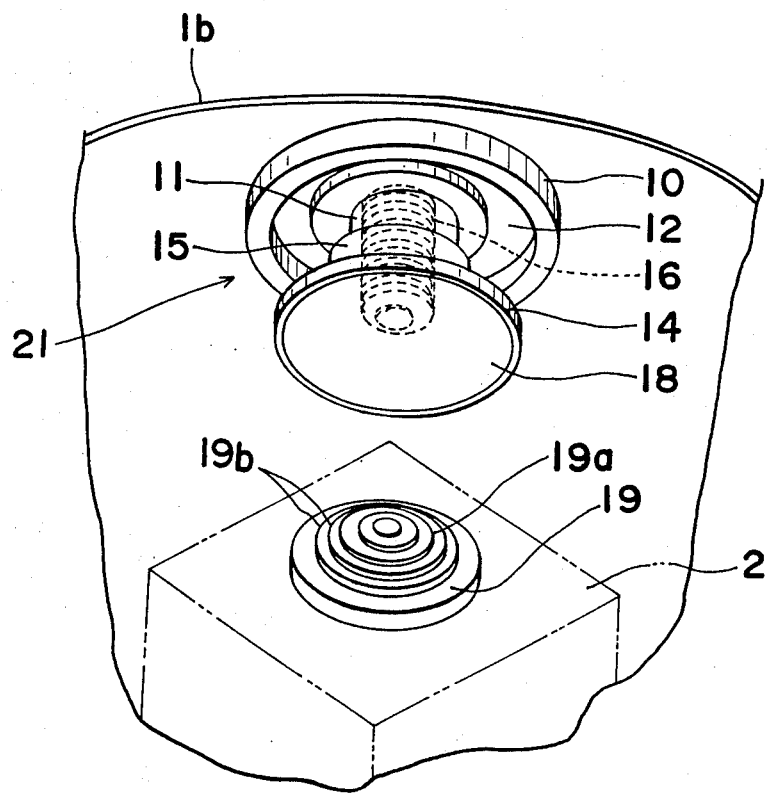
FIG. 3 is a disassembled perspective view of selected portions of a fuel cell system of FIG. 1.

Arranged between the interior wall of the lid body 12 and the top of the fuel cell stack 2 is a vibration-proof device 20 which comprises a forcing means 21 and a counter member 19 provided at its upper portion with a spherical stepped projection 19a. As shown in FIGS. 2 and 3, the forcing means 21 comprises a cylindrical guide post 11, a pressure member 14, a sleeve 15, and a spring 16. The guide post 11 is downwardly fixed to the interior wall of the lid body 12 and provided at its lower end with an outwardly extending flange 17 by bolts to limit the downward movement of the sleeve 15 and to prevent the pressure member 14 from being out of place. The pressure member 14 is fixed to the sleeve 15 slidably mounted on the guide post 11, and forced on the counter member 19 by the spring 16 arranged between the lid body 12 and the pressure member 14. The pressure member 14 is provided at its lower end with a spherical recess 14a to which buffer member 18 made of an elastic material such as fluorinated rubber is attached.

In use, the pressure member 14 is being forced by a spring 16 on the stepped projection 19a of the counter member 19 so that the fuel cell stack 2 is centered by the vibration-proof device 20 and held in the vertical position. If any vibration is applied to the fuel cell stack 2 through the support 6, the vibration of the fuel cell stack 2 is reduced to a minimum since the vibration-proof device 20 prevents the horizontal movement of the fuel cell stack 2 at the upper portion. The edges 19b of the stepped projection 19a may bite into the buffer member 18 which presents the counter member 19 from sliding in the horizontal direction.

According to the present invention, it is possible to prevent the fuel cell stack from inclination and overturning even if the fuel cell stack comprises a large number of fuel cells exceeding 300 cells. Accordingly, the present invention makes it possible to provide a fuel cell system with a high safety and high reliability.

What we claim is:

1. A fuel cell system of the kind wherein a fuel cell stack is housed in a pressure vessel comprising a vibration-proof device arranged between the top of the fuel cell stack and the pressure vessel, said device comprising a forcing means mounted on an interior wall of the top of the pressure vessel, and a counter member mounted on the top of the fuel cell stack and provided at its top with a projection or recess in a spherical or conical form, said forcing means comprising a pressure member provided at its bottom with a recess or projection in a spherical or conical form and forced downward to engage with the top of said counter member.

2. The fuel cell system according to claim 1 wherein the pressure member is provided with a spherical recess, and wherein the counter member is provided with a spherical projection.

3. The fuel cell system according to claim 1 wherein the pressure member is provided with a conical recess, and wherein the counter member is provided with a conical projection.

4. The fuel cell system according to claim 1 wherein the pressure member is provided with a spherical projection, and wherein the counter member is provided with a spherical recess.

5. The fuel cell system according to claim 1 wherein the pressure member is provided with a conical projection, and wherein the the counter member is provided with a conical recess.

6. The fuel cell system according to claim 1 wherein a buffer member is attached to a surface of the recess formed in the pressure member or counter member.

7. The fuel cell system according to claim 6 wherein the projection of the counter member or pressure member is in a stepped spherical or conical form.

8. A vibration-proof device for a fuel cell system of the kind wherein a fuel cell stack is housed in a pressure vessel and mounted at its lower end on the bottom of the pressure vessel, comprising a pressure member mounted on an interior wall of the top of the pressure vessel and provided at its bottom with a recess or projection having a spherical or conical form, and a counter member mounted on the top of the fuel cell stack and provided at its top with a projection or recess in a spherical or conical form so that its projection or recess engages with the recess or projection of said pressure member, said pressure member is forced on the top of said counter member.

* * * * *